United States Patent
Pan et al.

[19]

[11] Patent Number: 5,936,806
[45] Date of Patent: Aug. 10, 1999

[54] FLYING HEAD SLIDER AND SUSPENSION ASSEMBLY WITH STRESS RELIEF FOR CONTROLLING SLIDER CROWN THERMAL SENSITIVITY

[75] Inventors: Tzong-Shii Pan, San Jose; Ming-Ching Tang, Saratoga, both of Calif.

[73] Assignee: International Business Machines Corporation, Armonk, N.Y.

[21] Appl. No.: 09/036,218

[22] Filed: Mar. 6, 1998

[51] Int. Cl.[6] ........................................................ G11B 5/48
[52] U.S. Cl. ................................................................ 360/104
[58] Field of Search ............................................. 360/104

[56] References Cited

U.S. PATENT DOCUMENTS

| | | | |
|---|---|---|---|
| 5,331,489 | 7/1994 | Johnson et al. | 360/104 |
| 5,434,731 | 7/1995 | Hagen | 360/104 |
| 5,467,236 | 11/1995 | Hatanai | 360/104 |
| 5,473,488 | 12/1995 | Gustafson et al. | 360/104 |
| 5,504,640 | 4/1996 | Hagen | 360/104 |
| 5,608,590 | 3/1997 | Ziegler et al. | 360/104 |
| 5,636,088 | 6/1997 | Yamamoto et al. | 360/104 |
| 5,771,137 | 6/1998 | Nagase | 360/104 |
| 5,774,305 | 6/1998 | Boutaghou | 360/104 |

FOREIGN PATENT DOCUMENTS

| | | | |
|---|---|---|---|
| 59-101072 | 11/1984 | Japan | G11B 21/20 |
| 61-253678 | 11/1986 | Japan | G11B 21/20 |

*Primary Examiner*—A. J. Heinz
*Attorney, Agent, or Firm*—John H. Holcombe

[57] ABSTRACT

Disclosed is a flying head slider and suspension assembly with a stress relief for minimizing the stress between a slider having a first linear coefficient of thermal expansion, and a suspension having a surface for adhering the head slider, the suspension having a second linear coefficient of thermal expansion greater than the first linear coefficient of thermal expansion. The flying head slider may be employed for recording and reproducing data on a magnetic disk of a magnetic disk file. One embodiment of the stress relief comprises an opening in the suspension separating the adherence surface into separate portions, each portion for adhering a portion of the head slider, and connected by formed legs on either side of the opening. Another embodiment comprises at least one shaped bumper between the surface and the head slider to provide a uniform thickness of adhesive for adhering the head slider. A further embodiment comprises a reduced thickness portion of the suspension at the surface which is less than the total area of the adherence surface. If the suspension is an integrated lead suspension having several layers which are selectively etched, the same processes and the same layers may be used for producing the stress relief.

23 Claims, 3 Drawing Sheets

FLYING HEAD SLIDER AND SUSPENSION ASSEMBLY WITH STRESS RELIEF FOR CONTROLLING SLIDER CROWN THERMAL SENSITIVITY

TECHNICAL FIELD

This invention relates to flying heads and suspensions, and, more particularly, to controlling thermal sensitivity of flying head slider crowns which occurs as the result of thermal expansion coefficient mismatch.

BACKGROUND OF THE INVENTION

Flying heads are employed, for example, in magnetic disk lot drives wherein a magnetic head is mounted on a slider which flies at a small distance over a moving magnetic disk. The magnetic head records and reads data in concentric data tracks on the surface of the moving magnetic disk.

Key elements in improving the performance of magnetic disk drives are the capacity of data stored on the magnetic disk and the speed of accessing that data. By decreasing the flying height, a smaller magnetic recording signal may be effectively read by the magnetic head, allowing the linear recording density of a track to be increased, thereby increasing the data capacity of each track. The speed of accessing data is often increased by increasing the rotational velocity of the disk. A corresponding increase in the ambient temperature of the disk drive is likely to occur, thereby affecting the temperature of the head and slider.

Typically, a flying head slider is made of a ceramic material (e.g., $Al_2O_3TiC$) and the suspension to which the slider is attached is made of a spring steel, which materials have different linear thermal expansion coefficients. This mismatch in thermal expansion coefficients results in stress between the spring steel suspension and the attached ceramic slider. This stress causes the slider to bend, resulting in a distortion of the ceramic slider as well as its air bearing, which is the surface of the slider facing the moving magnetic disk and is the surface which controls the flying characteristics of the slider. Consequently, the constancy of the flying height or the flying angle of the slider with respect to the disk may be adversely affected. Specifically, if the flying height increases, or if the flying angle moves the magnetic head further from the disk, the read signal amplitude will decrease considerably. Similarly, if the flying height decreases, or if the flying angle moves the magnetic head closer to the disk, the risk of the head contacting the disk (head crash) is increased.

This problem is noted in U.S. Pat. No. 5,636,088, Yamamoto et al., issued Jun. 3, 1997, and sets the ratio of the flexure spring to the height of a slider to a ratio of 0.047 or less, sets the ratio of the height of the slider to the length of the slider to a ratio of 0.245 or less, or sets the ratio of an actual adhesion area of the slider to the possible adhesion area to a ratio of 0.42 or less, while adding a temperature compensation member adhered to the slider or the flexure spring.

However, reduction in the thickness of the suspension, or reduction in the thickness of the slider, have the potential to produce instability in the slider/suspension assembly with corresponding instability in the slider-disk flying characteristics.

Some adhesives have low glass transition temperatures. If the operating temperature is greater than the glass transition temperature ($T_g$) of the adhesive, the adhesive will generate much less stress and the slider will bend much less. However, for these low Tg adhesives, the "creep" property is usually worse. "Creep" is the spreading of microscopic cracks from bonding imperfections, which is worse under higher temperature and stressed conditions, such that the strength of the adhesive is reduced after a period of time. Thus, upon receiving a shock, the slider might sheer off the suspension. Additionally, other considerations may make it desireable to operate the drive at a temperature lower than the glass transition temperature.

SUMMARY OF THE INVENTION

It is an object of the present invention to control thermal sensitivity of flying head slider crowns which occurs as the result of thermal expansion coefficient mismatch without producing alteration or bonding reliability in the slider/suspension assembly.

Disclosed is a flying head slider and suspension assembly with a stress relief for minimizing the stress between a slider having a first linear coefficient of thermal expansion, and a suspension having a surface for adhering the head slider, the surface having a second linear coefficient of thermal expansion greater than the first linear coefficient of thermal expansion.

The flying head slider may be employed for recording and reproducing data on a magnetic disk of a magnetic disk file. One embodiment of the stress relief comprises an opening in the surface separating the surface into separate portions, each portion for adhering a portion of the head slider, the surface portions connected by formed legs on either side of the opening. Another embodiment of the stress relief comprises at least one shaped bumper between the surface and the head slider to provide a uniform thickness of adhesive for adhering the head slider. Still another embodiment of the stress relief comprises a reduced thickness portion of the suspension at the surface, the reduced thickness area comprising less than the total area of the adherence surface.

In the instance where the suspension is an integrated lead suspension having several layers which are selectively etched, the same processes and some of the same layers may be used for producing embodiments of the stress relief of the present invention.

For a fuller understanding of the present invention, reference should be made to the following detailed description taken in conjunction with the accompanying drawings.

DETAILED DESCRIPTION OF THE INVENTION

Figure 1:
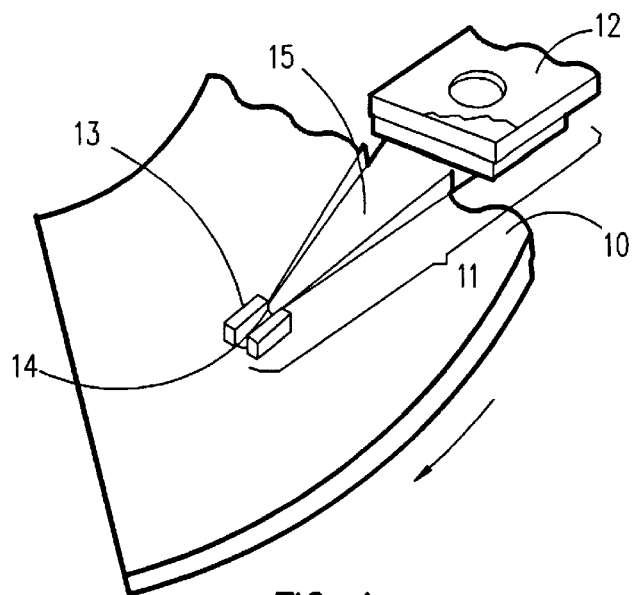
FIG. 1 is a diagrammatic representation of a magnetic disk, arm and suspension, and slider incorporating the stress relief of the present invention.
Figure 2:
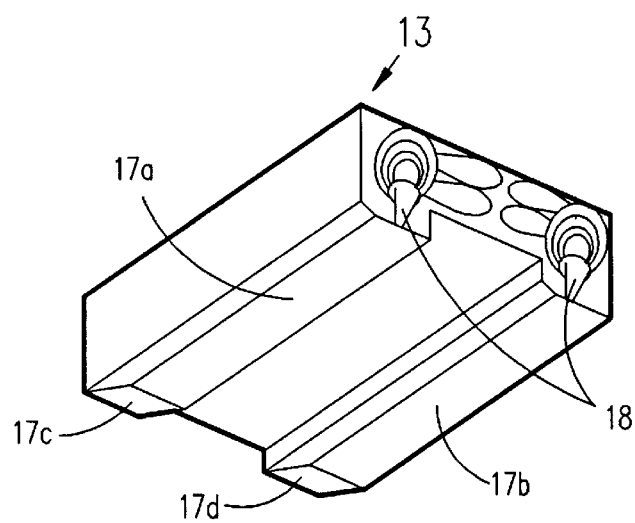
FIG. 2 is a perspective view of the slider and mounted magnetic heads of FIG. 1.

Referring to FIG. 1, a magnetic disk 10 of a magnetic disk drive is illustrated with a suspension 11 fixed to an arm 12 of an actuator (not shown). The suspension 11 includes a magnetic head slider 13, a flexure 14, which is also called a gimbal, and a load spring 15. Referring additionally to FIG. 2, magnetic heads 18 are mounted on the slider 13, typically at the trailing edge of the slider, and the slider 13 flies on an air bearing in close proximity to the moving magnetic disk 10 as the disk is rotated by a motor (not shown). The magnetic head records and reproduces data in concentric data tracks on the surface of the moving magnetic disk 10. The load spring 15 exerts a force through a gimbal dimple of the flexure on a flexure tongue to urge the slider towards the magnetic disk 10. The slider 13 is bonded to the flexure tongue of flexure 14 by means of an adhesive. A pair of slider rails 17a and 17b (other arrangements with more rails or with rails of shapes or dimensions with respect to the slider may be provided) are provided on the surface of the slider 13 facing the magnetic disk 10. Typically the rails extend along an axis of symmetry of the load spring 15 and in the tangential direction with respect to the tracks on the disk 10. In addition, the surfaces of the slider rails 17a and 17b at the air entrance end are provided with tapers 17c and 17d for flying the slider on a submicron level by the air bearing effect caused by the relative speed between the magnetic head slider 13 and the disk 10. Typically, the slider flies at a slight angle so that the heads 18 are at the end of the slider rails closest to the disk 10 and the corresponding recording tracks. Another arrangement typical in the industry is a short third rail centered at the rear of the slider having a single head at the center rail. The advantage of two heads, one on each of the outrigger rails, is that, since only one head is used, the yield expectation of having one good head is vastly improved. The advantage of a single head on the center rail is that flying characteristic of the center rail is more stable with respect to the disk.

Figure 3:
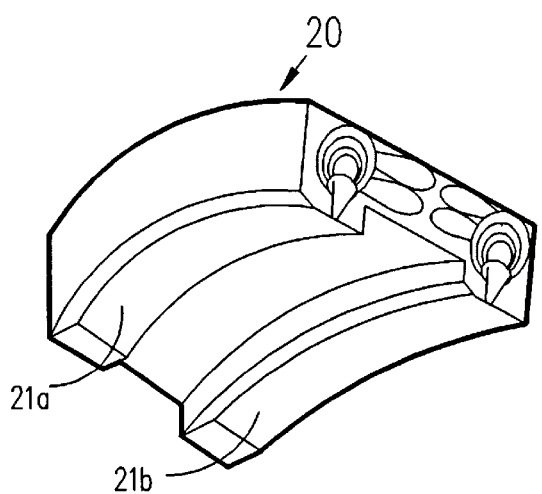
FIG. 3 is an exaggerated representation of the slider distortion of the prior art.

Referring to FIG. 3, typically, the slider 20 is made of a ceramic material (e.g., $Al_2O_3TiC$) and the suspension to which the slider is attached is made of a spring steel, which materials have differing linear thermal expansion coefficients. In the prior art slider and suspension assembly, this mismatch in thermal expansion coefficients results in a strain in the adhesive between the spring steel suspension and the attached ceramic slider as the ambient temperature changes. This strain will generate stress, as well as a force, in the slider. The stress and force cause the ceramic slider 20 to bend, resulting in a distortion of the slider at the crown 21a and 21b, which is the surface of the slider rails facing the moving magnetic disk and is the surface which controls the flying characteristics of the slider. The coefficient of thermal expansion of the spring steel suspension is greater than that of the ceramic slider. Consequently, the slider tends to bend as the temperature changes (called crown sensitivity). The crown sensitivity is defined as crown change per degree C. Positive crown means that the trailing and leading edges of the slider bend away from the disk and toward the flexure, and negative crown means that the trailing and leading edges of the slider bend toward the disk and away from the flexure. Thus, if the temperature of the drive rises toward the upper end of the expected nominal operating range, the ends of the slider rails tend to bend toward the disk as illustrated (the illustration is highly exaggerated), altering the flying characteristics of the slider 20. The slider 20 is designed for flying height or the flying angle of the slider with respect to the disk may thus be adversely affected. Specifically, if the flying height increases, or if the flying angle moves the magnetic head further from the disk, the read signal amplitude will decrease considerably. Similarly, if the flying height decreases, or if the flying angle moves the magnetic head closer to the disk, the risk of the head contacting the disk (head crash) is increased.

One way of reducing the stress is to operate the drive above the glass transition temperature of the adhesive, which is the temperature at which the adhesive tends to change from a crystalline to a glass state. For example, low and high modulus adhesives are typically used in the industry. A low modulus adhesive, such as Abelbond #8385, has a lower glass transition temperature ($T_g$) than a high modulus adhesive, such as Loctite #380 (modulus refers to Young's modulus). The low modulus adhesive tends to change from a crystalline to a glass state between 25 degrees C. and 50 degrees C., whereas the high modulus adhesive maintains the crystalline state. When in the glass state, the adhesive is more flexible (reduced Young's modulus) and will absorb more strain with lower stress. Thus, if the operating temperature were greater than the glass transition temperature of the low modulus adhesive, due to the small Young's modulus, the adhesive would absorb the internal strain and create only a small stress and the slider would not bend. However, low modulus adhesives have poorer "creep" properties and are likely to create a reliability problem in the long run. Thus, in some instances, a two adhesive process is used, one of which is the low modulus adhesive, to prevent the creep effect. However, a two adhesive process complicates the fabrication process and increases cost. Additionally, a high modulus adhesive is often preferred because of the shorter curing time and simple process for assembly of the slider to the suspension.

It is therefore desirable to minimize the crown sensitivity for the entire operating temperature range without producing alteration or instability in the slider/suspension assembly.

In accordance with the present invention, a stress relief is provided for the head and suspension assembly for minimizing the stress between a head slider having a first linear coefficient of thermal expansion, and a suspension having a surface for adhering the head slider, and having a second linear coefficient of thermal expansion different than the first coefficient of thermal expansion. Thus, the sensitivity of the slider crown to the different coefficients of thermal expansion will be reduced, while allowing a high modulus adhesive to be utilized.

Figure 4A:
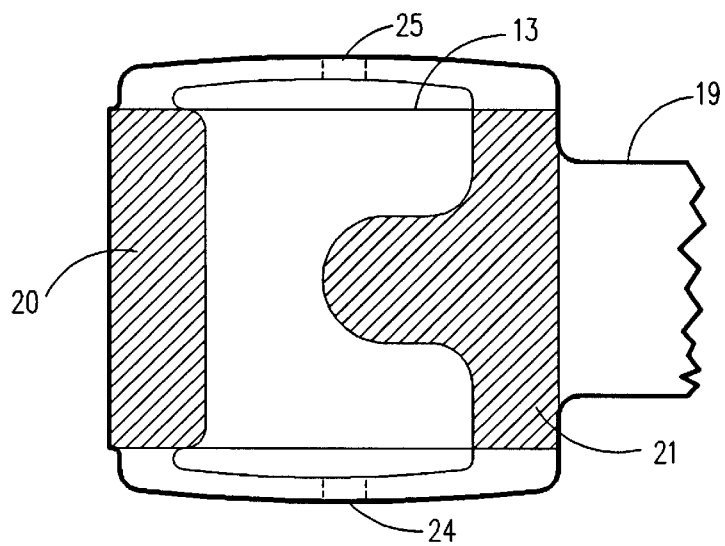
FIGS. 4A and 4B are, respectively, plan and side views of a suspension incorporating one embodiment of the present invention.
Figure 4B:

FIGS. 4A and 4B illustrate one embodiment of the stress relief of the present invention in which an opening is formed in the flexure tongue 19 at the surface contacting the slider 13, separating the flexure tongue surface into separate portions 20 and 21. Each portion is adhered to a separate portion of the slider 13. The separate portions 20 and 21 are connected by formed side legs 24 and 25 on either side of the opening. Thus, when the temperature changes, the formed legs 24 and 25 will generate a counter moment to compensate for the thermal mismatch such that the crown change is minimized.

Figure 5A:
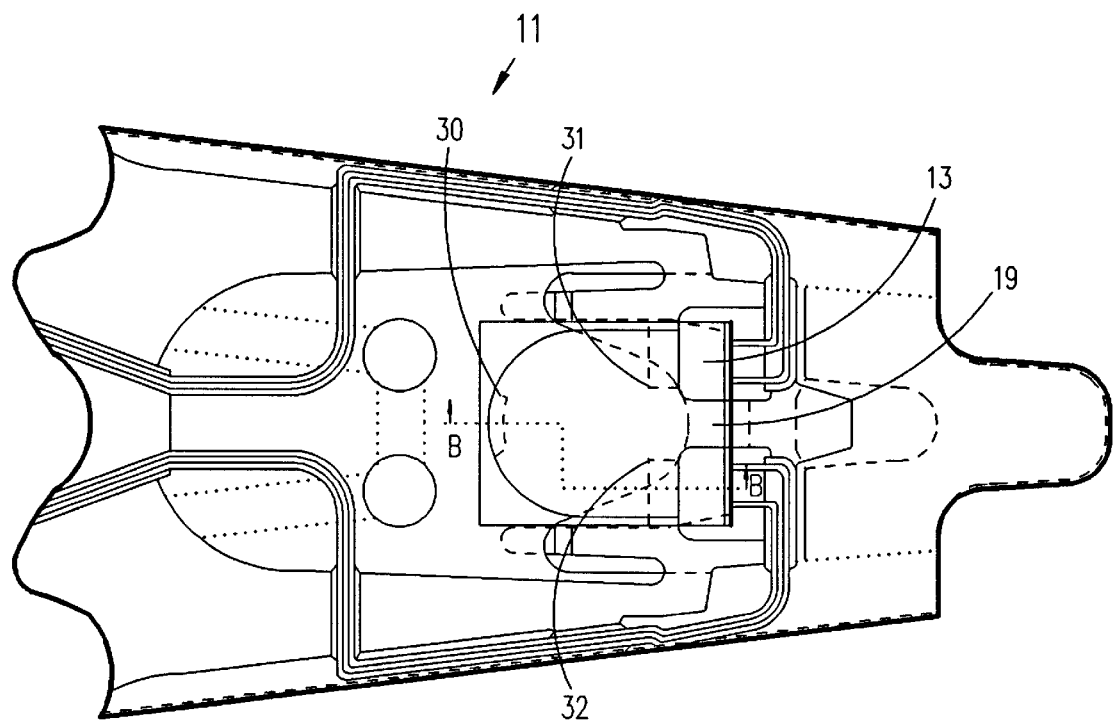
FIGS. 5A and 5B are, respectively, plan and side views of a suspension and slider assembly incorporating another embodiment of the present invention.
Figure 5B:
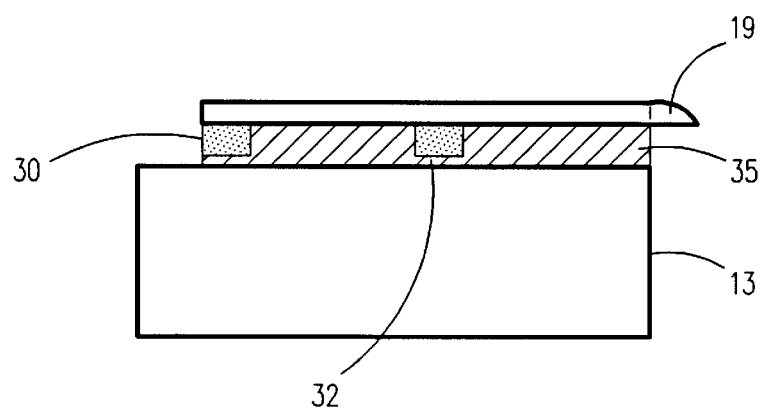

FIGS. 5A and 5B illustrate another embodiment of the stress relief of the present invention. Typically, the assembly process of bonding the slider 13 to the flexure tongue 19 employs a fixture which rotates the suspension to the slider 13 after the adhesive has been applied to the slider. The rotation often does not end at the exact parallel position, and if one end touches the adhesive first, a wedge effect occurs, pushing the adhesive so that its thickness is not uniform. This alters both the internal stress distribution and the bending moment between the flexure tongue 19 and the slider 13 during temperature change, typically increasing the crown sensitivity of the slider. Additionally, it will be more difficult to increase bond thickness.

In accordance with the invention, at least one shaped bumper, shown as three spaced bumpers 30, 31 and 32, are placed between the surface of the flexure tongue 19 and the slider 13 to provide a more uniform thickness of the adhesive 35 for adhering the slider. The bumpers may be of different numbers, shapes or sizes than the illustration. The bumpers also are thicker than the normal adhesive thickness and displace some of the adhesive during the attachment, creating a thicker adhesive which is pushed into a central area, reducing the bonded area, thereby reducing both the strain and the force moment, and reducing the crown sensitivity.

If the suspension 11 is an integrated lead suspension having several layers which are selectively etched, including an insulating layer, the same etching processes may be used to form the bumpers 30, 31 and 32 from the insulating layer without adding any cost to the suspension and is easy to implement. Typically, the insulating layer is a polymite layer, which may be 18 microns in thickness. At least 5 microns of adhesive may be employed, resulting in a total thickness of 18 to 25 microns, reducing the bonded area and increasing its thickness.

Figure 6:
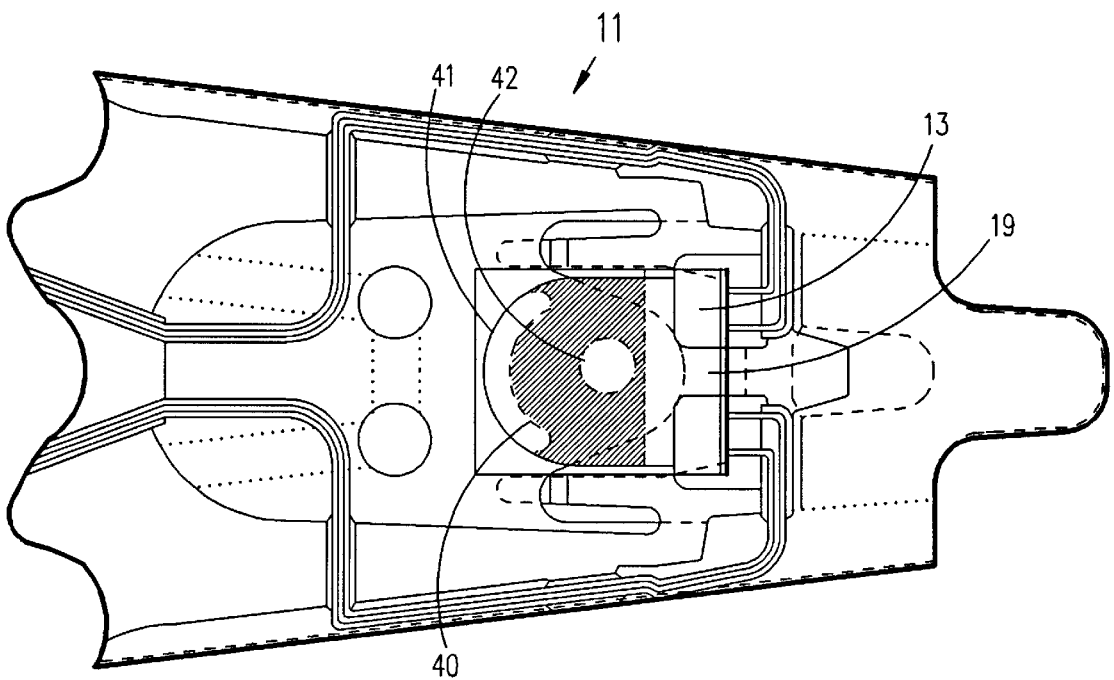
FIG. 6 is a plan view of suspension and slider assembly incorporating still another embodiment of the present invention.

FIG. 6 illustrates still another embodiment of the stress relief of the present invention. A reduced thickness portion 40 of the suspension 11 is provided at the flexure tongue 19, the reduced thickness area 40 comprising less than the total area of the adherence surface 41 of the flexure tongue 19. The reduced thickness is preferably on the side of the flexure tongue which is opposite the adhesion surface. The full thickness areas of the adherence surface 41 insure that the stability in the slider/suspension assembly is maintained, with corresponding stability in the slider-disk flying characteristics. The dimple area 42 of the flexure tongue is the area where the dimple of the suspension contacts the flexure tongue and provides a gimbal and provides much of the force from the load spring 15, and is also of full thickness for transmission of the spring force to the slider 13. The dimple area is approximately centered with respect to the adherence surface 41 of the flexure tongue.

The reduced thickness area 40 reduces the bending stiffness of the flexure tongue 19 which generates the moment to bend the slider. Hence, the bending moment is lower and the crown sensitivity is reduced.

If the suspension 11 is an integrated lead suspension having several layers which are selectively etched, including the flexure tongue 19, the same etching processes may be used to form the reduced thickness area 40. Thus, the reduced thickness area may be formed without adding any cost to the suspension and is easy to implement.

Further, any combination of the above stress relief embodiments may be used together to provide the stress relief of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. A flying head and suspension assembly, comprising:
   a head slider for data recording/reproducing having a first linear coefficient of thermal expansion;
   a suspension having a surface for adhering said head slider, said surface having a second linear coefficient of thermal expansion greater than said first linear coefficient of thermal expansion; and
   a stress relief for minimizing the stress between said surface and said head slider, said stress relief comprising an opening in said surface separating said surface into separate portions, each portion for adhering a portion of said head slider, said surface portions connected by formed legs on either side of said opening.

2. The flying head and suspension assembly of claim 1, wherein said formed legs are extending upright in a direction away from said head slider.

3. A flying head and suspension assembly, comprising:
   a head slider for data recording/reproducing having a first linear coefficient of thermal expansion;
   an integrated lead suspension having a surface for adhering said head slider, said surface having a second linear coefficient of thermal expansion greater than said first linear coefficient of thermal expansion; and
   a stress relief for minimizing the stress between said surface and said head slider, said stress relief comprising at least one shaped bumper between said surface and said head slider to provide a uniform bond line for adhering said head slider, wherein said at least one shaped bumper comprises an unremoved portion of said integrated lead suspension.

4. The flying head and suspension assembly of claim 3, wherein said integrated lead suspension comprises at least a base layer and an insulating layer, and wherein said suspension surface comprises said base layer and said at least one shaped bumper comprises unremoved portions of at least said insulating layer.

5. A flying head and suspension assembly, comprising:
   a head slider for data recording/reproducing having a first linear coefficient of thermal expansion;
   a suspension having a surface for adhering said head slider, said surface having a second linear coefficient of thermal expansion greater than said first linear coefficient of thermal expansion; and
   a stress relief for minimizing the stress between said surface and said head slider, said stress relief comprising a reduced thickness portion of said suspension at said surface, said reduced thickness area comprising less than the total area of said adherence surface.

6. The flying head and suspension assembly of claim 5, wherein said suspension additionally comprises a dimple contact area, and wherein said reduced thickness portion substantially surrounds said dimple contact area.

7. The flying head and suspension assembly of claim 6, wherein said reduced thickness portion comprises a central portion of said surface, said dimple contact area substantially centered in said central portion.

8. The flying head and suspension assembly of claim 5, wherein said suspension comprises an integrated lead suspension which is formed by processes including etching of said suspension, and wherein said reduced thickness portion is produced in the same etching process as said integrated lead suspension.

9. A suspension for attaching a flying head slider, said flying head slider for data recording/reproducing and having a first linear coefficient of thermal expansion, comprising:
   a suspension having a surface for adhering said flying head slider, said surface having a second linear coefficient of thermal expansion greater than said first linear coefficient of thermal expansion; and
   a stress relief for minimizing the stress between said surface and said head slider, said stress relief comprising an opening in said surface separating said surface into separate portions, each portion for adhering a portion of said flying head slider, said surface portions connected by formed legs on either side of said opening.

10. The suspension of claim 9, wherein said formed legs are extending upright in a direction away from said head slider.

11. A suspension for attaching a flying head slider, said flying head slider for data recording/reproducing and having a first linear coefficient of thermal expansion, comprising:

an integrated lead suspension having a surface for adhering said flying head slider, said surface having a second linear coefficient of thermal expansion greater than said first linear coefficient of thermal expansion; and a stress relief for minimizing the stress between said surface and said head slider, wherein said stress relief comprises at least one shaped bumper between said surface and said flying head slider to provide a uniform bond line for adhering said flying head slider, wherein said at least one shaped bumper comprises an unremoved portion of said integrated lead suspension.

12. The suspension of claim 11, wherein said integrated lead suspension comprises at least a base layer and an insulating layer, and wherein said suspension surface comprises said base layer and said at least one shaped bumper comprises unremoved portions of at least said insulating layer.

13. A suspension for attaching a flying head slider, said flying head slider for data recording/reproducing and having a first linear coefficient of thermal expansion, comprising:

a suspension having a surface for adhering said flying head slider, said surface having a second linear coefficient of thermal expansion greater than said first linear coefficient of thermal expansion; and a stress relief for minimizing the stress between said surface and said head slider, said stress relief comprising a reduced thickness portion of said suspension at said surface, said reduced thickness area comprising less than the total area of said adherence surface.

14. The suspension of claim 13, wherein said suspension additionally comprises a dimple contact area, and wherein said reduced thickness portion substantially surrounds said dimple contact area.

15. The suspension of claim 14, wherein said reduced thickness portion comprises a central portion of said surface, said dimple contact area substantially centered in said central portion.

16. The suspension of claim 13, wherein said suspension comprises an integrated lead suspension which is formed by processes including etching of said suspension, and wherein said reduced thickness portion is produced in the same etching process as said integrated lead suspension.

17. A magnetic disk drive, comprising:

at least one magnetic disk for recording magnetic signals;

at least one head slider for flying on an air bearing in close proximity to said at least one magnetic disk, for data recording/reproducing magnetic signals on said at least one magnetic disk, said head slider having a first linear coefficient of thermal expansion;

at least one suspension for urging a corresponding head slider in close proximity to said at least one magnetic disk, said suspension having a surface for adhering said head slider, said surface having a second linear coefficient of thermal expansion greater than said first linear coefficient of thermal expansion; and a stress relief for minimizing the stress between said surface and said head slider, said stress relief comprising an opening in said surface separating said surface into separate portions, each portion for adhering a portion of said head slider, said surface portions connected by formed legs on either side of said opening.

18. The magnetic disk drive of claim 17, wherein said formed legs are extending upright in a direction away from said head slider.

19. A magnetic disk drive, comprising:

at least one magnetic disk for recording magnetic signals;

at least one head slider for flying on an air bearing in close proximity to said at least one magnetic disk, for data recording/reproducing magnetic signals on said at least one magnetic disk, said head slider having a first linear coefficient of thermal expansion;

at least one suspension for urging a corresponding head slider in close proximity to said at least one magnetic disk, said suspension having a surface for adhering said head slider, said surface having a second linear coefficient of thermal expansion greater than said first linear coefficient of thermal expansion; and a stress relief for minimizing the stress between said surface and said head slider, said stress relief comprising a reduced thickness portion of said suspension at said surface, said reduced thickness area comprising less than the total area of said adherence surface.

20. The magnetic disk drive of claim 19, wherein said suspension additionally comprises a dimple contact area, and wherein said reduced thickness portion substantially surrounds said dimple contact area.

21. The magnetic disk drive of claim 20, wherein said reduced thickness portion comprises a central portion of said surface, said dimple contact area substantially centered in said central portion.

22. A magnetic disk drive, comprising:

at least one magnetic disk for recording magnetic signals;

at least one head slider for flying on an air bearing in close proximity to said at least one magnetic disk, for data recording/reproducing magnetic signals on said at least one magnetic disk, said head slider having a first linear coefficient of thermal expansion;

at least one integrated lead suspension for urging a corresponding head slider in close proximity to said at least one magnetic disk, said suspension having a surface for adhering said head slider, said surface having a second linear coefficient of thermal expansion greater than said first linear coefficient of thermal expansion; and a stress relief for minimizing the stress between said surface and said head slider, said stress relief comprising at least one shaped bumper between said surface and said head slider to provide a uniform bond line for adhering said head slider, wherein said at least one shaped bumper comprises an unremoved portion of said integrated lead suspension.

23. The magnetic disk drive of claim 22, wherein said integrated lead suspension comprises at least a base layer and an insulating layer, and wherein said suspension surface comprises said base layer and said at least one shaped bumper comprises unremoved portions of at least said insulating layer.

* * * * *